May 3, 1955     R. P. SAAR     2,707,614
STRESSED SEAL FOR BUTTERFLY VALVES
Filed Sept. 22, 1951     2 Sheets-Sheet 1
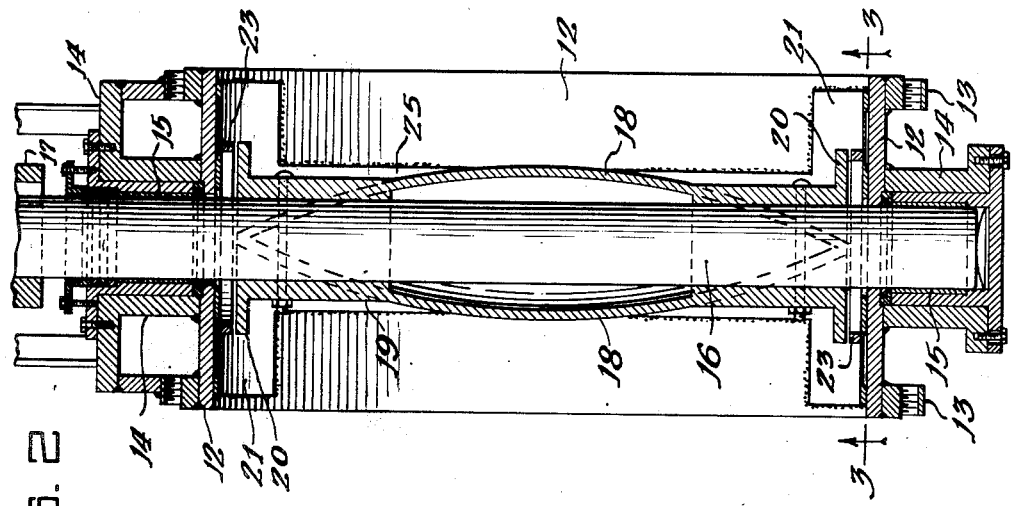
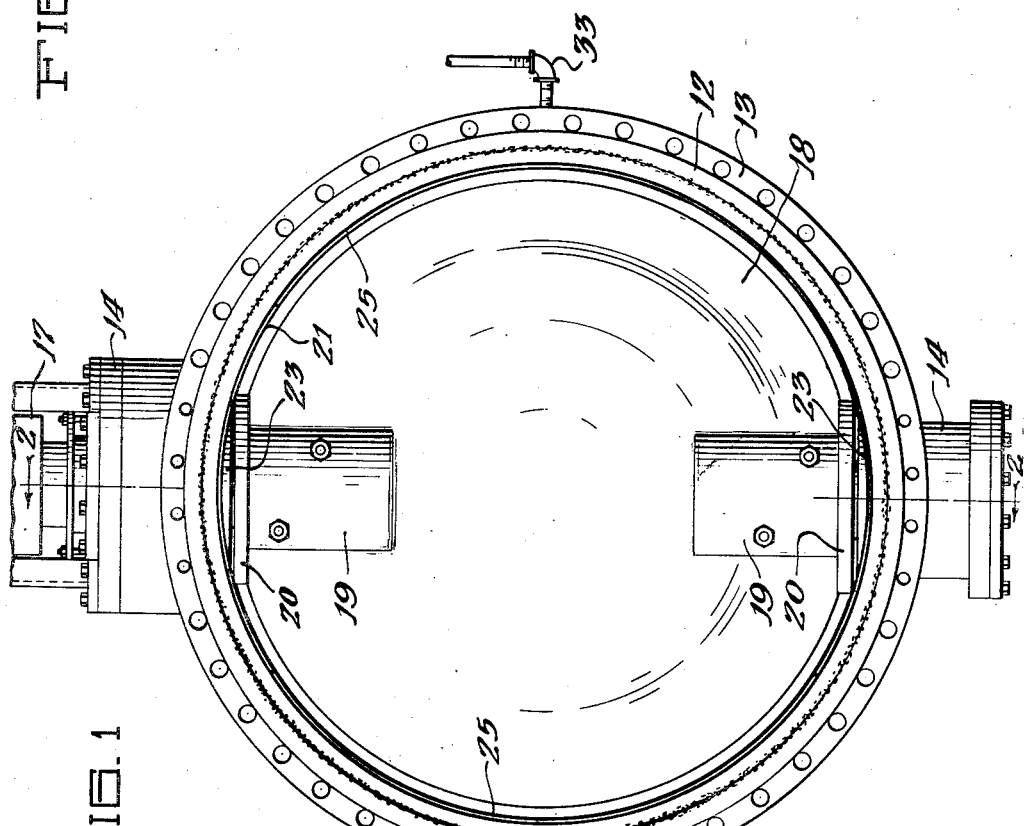
Inventor:
Robert P. Saar
By Schroeder, Merriam,
Hofgren & Brady
Attorneys May 3, 1955 R. P. SAAR 2,707,614
STRESSED SEAL FOR BUTTERFLY VALVES
Filed Sept. 22, 1951 2 Sheets-Sheet 2
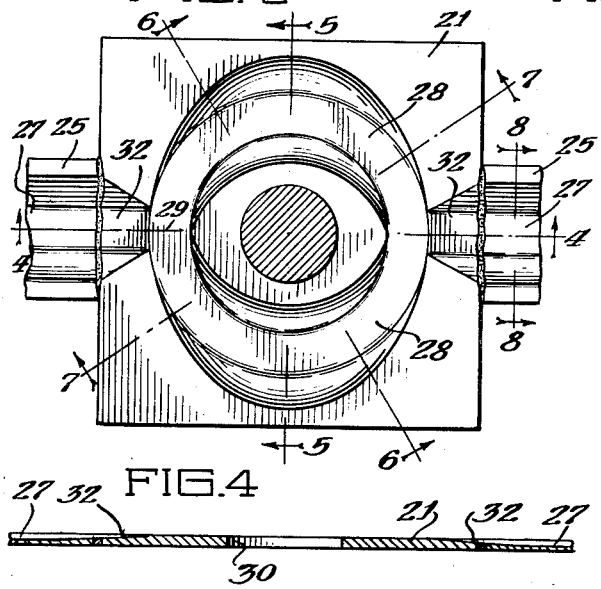
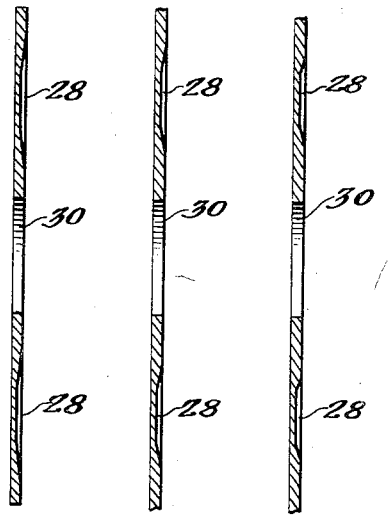
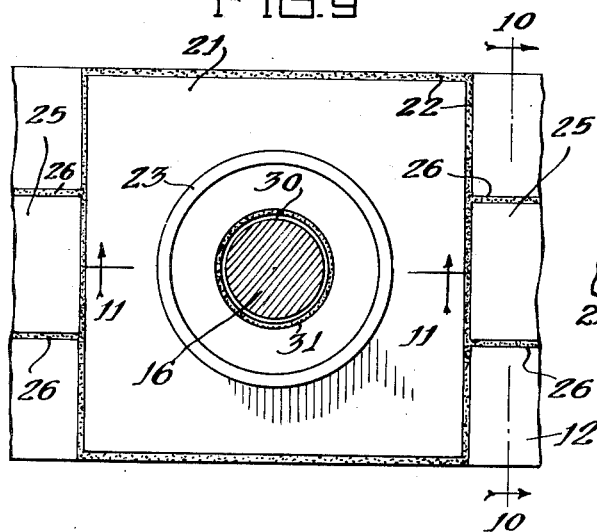
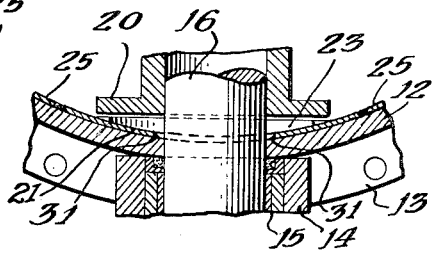
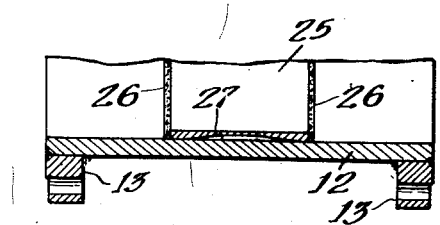
Inventor:
Robert P. Saar
By Schroeder, Merriam,
Hofgren & Brady
Attorneys

United States Patent Office 2,707,614
Patented May 3, 1955

2,707,614

STRESSED SEAL FOR BUTTERFLY VALVES

Robert P. Saar, Chicago, Ill., assignor to Henry Pratt Company, a corporation of Illinois Application September 22, 1951, Serial No. 247,801

4 Claims. (Cl. 251—173)

This invention relates to valve structures in which a metal seat may be expanded by fluid pressure, after the valve disc is turned to closed position, so as to form a very tight seal.

The primary object of the invention is to provide a valve which is machined to very close tolerances which will permit the disc to be turned, and has a metal seat which may be expanded to close the tiny peripheral clearance space which is necessary to permit the disc to turn. The valve may be of large diameter, as for example four feet, and is capable of operating satisfactorily in temperatures measuring from −120° F. to 650° F. The valve is particularly adaptable for use in large wind tunnels for testing jet engines, and the like.

Another object of the invention is to provide a precision built valve with heavy expansible seats which have special grooves on their under sides, adjacent to the main frame, which makes the metal thinner and more easily flexible adjacent to the face which contacts the periphery of the disc.

When liquid or gas pressure is admitted between the seat and the valve body, the metal seating strip is subjected to stresses within the elastic limit of the metal, as the movement is only a few ten thousandths of an inch. The edges of the strip are welded to the frame, and its central portion contacts the edge of the disc above the groove. This stress is similar to that on a beam which is fixed at both ends, is uniformly loaded on one side, and is opposed by a single central force on the opposite side. In addition to this, the circumference of the valve opening at the face of the seat is shortened slightly, which applies a circumferential compression.

At the bearing portion of the valve it is necessary to have a plano-convex hub plate which can also be moved a short distance into contact with seal plates provided on the disc adjacent to the bearing. Preferably, the plane seat is formed by welding a plano-convex ring to the curved body of the hub plate, so that the extended plane face of the ring intersects the face of the strips. In order to obtain the desired flexibility adjacent to the ring, special tapering semi-circular grooves are provided in the hub plate back of the ring. As the edge portions of the hub plates (except where connected to the strips) are welded to the frame around the bearing, the effect is similar to having a uniformly loaded beam secured at four points with force applied in the opposite direction at two points. The grooves are cut deeper in these sections to provide more flexibility. This flexibility permits the ring to move against the seal plate uniformly and provide a tight seal when pressure is admitted into the grooves.

The invention is illustrated in a preferred embodiment in the accompanying drawings, in which—

Fig. 1 is an elevational view of a stressed seal valve embodying the invention; Fig. 2, a sectional view, taken as indicated at line 2—2 of Fig. 1; Fig. 3, a plan view of the back of one of the hub plates, showing the grooves, taken as indicated at line 3—3 of Fig. 2; Fig. 4, a sectional view, taken as indicated at line 4—4 of Fig. 3; Fig. 5, a sectional view, taken as indicated at line 5—5 of Fig. 3; Fig. 6, a fragmentary sectional view, taken as indicated at line 6—6 of Fig. 3; Fig. 7, a fragmentary sectional view, taken as indicated at line 7—7 of Fig. 3; Fig. 8, a sectional view of one of the sealing strips, taken as indicated at line 8—8 of Fig. 3; Fig. 9, a fragmentary plan view, from the inside of the valve opening, showing a hub plate welded to the frame; Fig. 10, a fragmentary sectional view, taken as indicated at line 10—10 of Fig. 9; and Fig. 11, a fragmentary sectional view, taken as indicated at line 11—11 of Fig. 9.

In the embodiment illustrated, a circular frame 12 is provided with attaching flanges 13, and has bearing housings 14 for sleeve bearings 15.

A shaft 16 extends through the bearings, and is provided at one end with an actuating mechanism 17. A disc is formed by two turtle-back members 18 which are secured to the shaft by bolted brackets 19 provided at opposite ends with seal plates 20.

A pair of rectangular hub plates 21 are curved to fit the frame, and their outer edge portions are welded to the frame beyond the bearings, as indicated at 22. In order to provide a seat for the seal plates 20, a plano-convex ring 23 is welded to the body of the hub plate with its plane face extended, intersecting the face of the strips 25.

The strips 25 have their lateral edge portions welded to the inside of the frame, as indicated at 26, and their end portions are welded to the lateral edge portions of the hub plates and ground to form a smooth junction. The metal strips have a groove 27 with tapered side walls on the under side of the strips.

As best shown in Figs. 3–7, the inner side of each hub plate is provided with a pair of semi-circular complementary closed grooves 28 which begin in line with the center of the strip used, as indicated at 29, and progressively increase in depth until they reach the section shown in Fig. 5, which is about 90° from the section shown in Fig. 4. The walls of the grooves 28 are progressively tapered, as indicated by the elliptical lines in Fig. 3.

The center of the hub plate has an opening 30 for the shaft 16, and its edge portions are welded to the frame 12, as indicated at 31. As best shown in Figs. 3 and 4, the grooves 27 in the strips communicate with tapered grooves 32 to a starting position close to the ends of the semi-circular grooves 28. At the junction point of grooves 32 and grooves 28, the metal in the hub plates is substantially full thickness.

The pressure line 33 is shown in Fig. 1, and extends through the frame to the groove 27 under the strip 25. When the valve disc is turned to the closed position shown in Figs. 1 and 2, the fluid enters the closed grooves 27 and 28 and causes the strip 25 to move inwardly and engage the peripheral edge of the disc 18. At the same time, fluid pressure back of the curved hub plate 21 causes it to press the ring 23 inwardly against the seal plate and close that space. When the pressure is relieved through the line 33, the disc may be turned to open position.

The foregoing detailed description is given for clearness of understanding only, and no unnecessary limitations should be understood therefrom, for some modifications will be obvious to those skilled in the art.

I claim:

1. A valve structure comprising: a rounded frame having shaft bearings at opposite sides, flexible metal hub plates each with a shaft opening aligned with the respective bearings and having their outer edge portions welded to said frame beyond said bearings and their inner edge portions welded to the frame around the shaft opening, flexible metal strips extending around the frame from hub plate to hub plate and having their edge portions welded to the frame and ends of said hub plates so as to form a cylindrical seat for a valve disc, a groove with tapered side walls in the under side of said strips to make its center portion more easily flexed, and each of said hub plates having on its under side a pair of substantially semicircular complementary grooves completely surrounding the shaft opening and communicating with the groove under the strips, said complementary grooves beginning near the center line of the strip grooves and progressively increasing in depth so that the thinnest portion of the hub plates is at a position about ninety degrees from said center line; an oscillatable shaft passing through said shaft openings and journalled in said bearings; a disc on said shaft adapted to close the opening in the frame and having seal plates adjacent to said hub plates; and a pressure line for introducing fluid pressure into said grooves to expand said strips and hub plates inwardly to engage said disc and seal plates to make a tight seal.

2. A valve structure as specified in claim 1, in which the hub plate grooves meet and the end portions of the strip grooves communicate with taper grooves in the hub plate having a starting position close to the points where the ends of the semi-circular grooves in the hub plates meet, the metal in said hub plates being substantially of full thickness at said points.

3. A valve structure as specified in claim 1, in which the body of each hub plate is curved to fit the curvature of the frame and is formed with a plane seat adapted to sealingly engage the disc seal plate, said plane seat comprising a plano-convex ring which is welded to the body of the respective hub plate and has the plane of its plane face intersecting the face of the strips.

4. A valve structure as specified in claim 1, in which the opening in the frame is circular and the body of each hub plate is rectangular in outline and convex to fit said frame, each hub plate being formed with a plane seat adapted to sealingly engage the disc seal plate, said plane seat comprising a plano-convex ring which is welded to the body of the respective plate and has the plane of its plane face intersecting the face of the strips.

References Cited in the file of this patent
UNITED STATES PATENTS

| | | |
|---|---|---|
| 1,834,988 | White | Dec. 8, 1931 |
| 1,977,351 | Phillips | Oct. 16, 1934 |
| 1,990,309 | Phillips | Feb. 5, 1935 |